United States Patent
Yabutani et al.

(10) Patent No.: US 9,559,371 B2
(45) Date of Patent: Jan. 31, 2017

(54) FUEL CELL SYSTEM

(71) Applicants: AISIN SEIKI KABUSHIKI KAISHA, Kariya-shi (JP); KYOCERA CORPORATION, Kyoto-shi (JP)

(72) Inventors: Motohiko Yabutani, Kariya (JP); Shinpei Shiraishi, Kyoto (JP)

(73) Assignees: AISIN SIEKI KABUSHIKI KAISHA, Kariya-shi (JP); KYOCERA CORPORATION, Kyoto-shi (JP)

( * ) Notice: Subject to any disclaimer, the term of this patent is extended or adjusted under 35 U.S.C. 154(b) by 143 days.

(21) Appl. No.: 14/384,293

(22) PCT Filed: Mar. 11, 2013

(86) PCT No.: PCT/JP2013/001570
§ 371 (c)(1),
(2) Date: Sep. 10, 2014

(87) PCT Pub. No.: WO2013/136761
PCT Pub. Date: Sep. 19, 2013

(65) Prior Publication Data
US 2015/0044586 A1 Feb. 12, 2015

(30) Foreign Application Priority Data
Mar. 12, 2012 (JP) .................. 2012-055036

(51) Int. Cl.
*H01M 8/04* (2016.01)
*H01M 8/12* (2016.01)
(Continued)

(52) U.S. Cl.
CPC ............ *H01M 8/04992* (2013.01); *C01B 3/38* (2013.01); *H01M 8/04776* (2013.01);
(Continued)

(58) Field of Classification Search
None
See application file for complete search history.

(56) References Cited

U.S. PATENT DOCUMENTS 5,658,681 A * 8/1997 Sato .................... B60K 1/04
429/412
6,280,867 B1 * 8/2001 Elias .................. B60L 11/1881
222/333
(Continued)

FOREIGN PATENT DOCUMENTS

EP 2 042 469 A1 4/2009
EP 2 237 352 A2 10/2010
(Continued)

OTHER PUBLICATIONS

International Search Report Issued Apr. 23, 2013 in PCT/JP13/001570 Filed Mar. 11, 2013.
(Continued)

*Primary Examiner* — Ula C Ruddock
*Assistant Examiner* — Amanda Barrow
(74) *Attorney, Agent, or Firm* — Oblon, McClelland, Maier & Neustadt, L.L.P.

(57) ABSTRACT

To provide a fuel cell system that is advantageous for maintaining an S/C value in an appropriate region even when a rotational speed of the water pump is abnormal with respect to a target rotational speed region during a power generation operation of a fuel cell. When the rotational speed of the water pump is abnormal with respect to the target rotational speed region during the power generation operation of the fuel cell, the control unit repeats a short time increase and a short time decrease of the S/C value in a reforming reaction, by alternately repeating an increase in a short time ($\Delta T$ increase, within 10 seconds) and a decrease in a short time ($\Delta T$ decrease, within 10 seconds) of the rotational speed of the water pump with respect to an (Continued)

abnormal rotational speed, while continuing the power generation operation of the fuel cell, thereby averaging the S/C value.

4 Claims, 5 Drawing Sheets

(51) Int. Cl.
*H01M 8/06* (2016.01)
*C01B 3/38* (2006.01)

(52) U.S. Cl.
CPC ....... *H01M 8/0612* (2013.01); *H01M 8/0618* (2013.01); *H01M 8/12* (2013.01); *C01B 2203/0233* (2013.01); *C01B 2203/066* (2013.01); *C01B 2203/1241* (2013.01); *C01B 2203/1258* (2013.01); *C01B 2203/1288* (2013.01); *C01B 2203/169* (2013.01); *H01M 2008/1293* (2013.01); *Y02E 60/50* (2013.01); *Y02E 60/525* (2013.01)

(56) References Cited

U.S. PATENT DOCUMENTS

| | | | |
|---|---|---|---|
| 6,576,360 B2* | 6/2003 | Kawasumi | B01B 1/005 429/423 |
| 2002/0182460 A1* | 12/2002 | Okamoto | H01M 8/0612 429/436 |
| 2003/0198844 A1 | 10/2003 | Ukai et al. | |
| 2009/0155642 A1* | 6/2009 | Popham | H01M 8/0612 429/411 |
| 2009/0291337 A1 | 11/2009 | Tamura et al. | |
| 2012/0135322 A1* | 5/2012 | Yoshimine | H01M 8/04141 429/410 |
| 2012/0189926 A1* | 7/2012 | Yabutani | H01M 8/04425 429/414 |
| 2012/0208099 A1* | 8/2012 | Chen | H01M 8/04992 429/416 |

FOREIGN PATENT DOCUMENTS

| | | |
|---|---|---|
| JP | 2004 2154 | 1/2004 |
| JP | 2004 6093 | 1/2004 |
| JP | 2004 288505 | 10/2004 |
| JP | 2005 93346 | 4/2005 |
| JP | 2005 259586 | 9/2005 |
| JP | 2008 243596 | 10/2008 |
| JP | 2008 273822 | 11/2008 |
| JP | 2012 133915 | 7/2012 |
| JP | 2012 155849 | 8/2012 |
| WO | WO 2006/035176 A1 | 4/2006 |

OTHER PUBLICATIONS

Extended European Search Report issued Mar. 4, 2015 in Patent Application No. 13761897.1.

* cited by examiner

FUEL CELL SYSTEM

TECHNICAL FIELD

The present invention relates to a fuel cell system that supplies reforming water in a water tank to an evaporation unit via a water supply passage by a water pump to generate water vapor, and reforms a raw material gas with the water vapor to generate an anode gas.

BACKGROUND ART

In this type of fuel cell system, it has been requested that the reforming water be supplied to the evaporation unit with high accuracy to obtain a target amount of water vapor. Various techniques have been disclosed for this reason.

JP 2004-288505 A discloses a reforming device for a fuel cell that has a water tank configured to store the reforming water, and a water pump configured to supply the reforming water in the water tank to the evaporation unit. According to this, by detecting a change in water level in the water tank configured to store the reforming water, and by performing a feedback control of the change in water level to the water pump, the flow rate of the reforming water stored in the water tank is adjusted. This allows the flow rate of reforming water supplied to the reforming unit to be adjusted to a desired amount of water.

JP 2012-133915 A discloses a fuel cell system that avoids water wetting of a reforming catalyst (because introduction of the reforming water is too early) and caulking (because introduction of the reforming water is too late), by keeping the reforming water level in a place immediately before an inlet of the evaporation unit of the reformer at the time of the system startup, and by suppressing the variation of the timing of introducing the reforming water after igniting the reformer. In general, a water flow meter is used to detect whether the flow rate of the reforming water is normal, but since the flow rate is small, measurement accuracy of the flow rate is low. Moreover, the flow meter is very expensive, and there is also a problem in the durability. Therefore, in the above-described system, a water sensor configured to detect the presence of water has been used while abolishing the flow meter, and it has been considered that water supply accuracy of the reforming water to the evaporation unit is secured by satisfying the following items.

water is present in the water tank (detected by the water level sensor)

the water pump is normally rotating (detected by the pump rotational speed output)

water is present in the water supply passage (detected by the water sensor)

However, when the water pump is locked and enters a step-out (the water pump is locked by biting of foreign matter or the like) state, there is an output of the pump rotational speed, but the water pump is in a state of not being able to discharge the water. In this case, since the water pump cannot discharge the reforming water in the water tank to the evaporation unit side, the reforming water is not transmitted to the evaporation unit. However, even if the water does not flow, as long as the water is present in a sensing unit of the water sensor, there is a possibility that the water sensor erroneously detects the water presence state, that is, a state in which the water is flowing. Thus, in the state in which the reforming water is not supplied to the evaporation unit, a power generation operation of the fuel cell system may be continued. In this case, there is a concern about caulking (generation of hydrocarbon components of the raw material gas) of the reforming catalyst in the reforming unit, and damage to the fuel cell.

CITATION LIST

Patent Documents

Patent Document 1: JP 2004-288505 A
Patent Document 2: JP 2012-133915 A

DISCLOSURE OF THE INVENTION

Problem to be Solved by the Invention

In the water vapor reforming of the fuel cell system, an S/C value means a molar ratio of water vapor (steam) to a carbon component (carbon) contained in the raw material gas. If the flow rate of the reforming water is excessively supplied to the evaporation unit, there is a risk of induction of failures, such as an excessive increase in an amount of the water vapor, an excessive decrease in the temperature of the reforming unit and the evaporation unit, submergence of the reforming catalyst provided in the reforming unit, and accelerated degradation due to the water vapor of the reforming catalyst. In contrast, when the flow rate of the reforming water supplied to the evaporation unit is too small, the water vapor becomes insufficient in a reforming reaction. In this case, caulking occurs in the reforming unit, and there is a risk of inducing a failure such as breakdown or degradation of the reforming unit. It is preferred that an appropriate S/C value is set so as to suppress this failure.

During the power generation operation of the fuel cell, the rotational speed of the water pump may be abnormal with respect to a target rotational speed region in some cases. Resonance of the water pump is a major factor thereof. In this case, the flow rate of reforming water per unit time supplied to the evaporation unit by the water pump via the water supply passage may become excessive or become insufficient. As described above, if the reforming water is excessive, the S/C value becomes higher than an appropriate region. When the reforming water is insufficient, the S/C value becomes lower than the appropriate region. When the rotational speed of the water pump is abnormal with respect to the target rotational speed region as described above, the S/C value in the reforming reaction becomes inappropriate, and it is not possible to favorably generate the anode gas from the raw material gas.

The present invention has been made in view of the above-described circumstances, and an object thereof is to provide a fuel cell system that is advantageous to maintain the S/C value at the appropriate region, while suppressing or avoiding resonance, even when the rotational speed of the water pump is abnormal with respect to the target rotational speed region due to the resonance or the like during the power generation operation of the fuel cell.

Means for Solving Problem (1) A fuel cell system according to a first aspect of the present invention is provided with a fuel cell that is supplied with an anode gas and a cathode gas to generate electricity; an evaporation unit that evaporates reforming water to generate water vapor; a reforming unit that reforms a raw material gas using the water vapor generated in the evaporation unit by a reforming reaction to form the anode gas; a water tank that stores the reforming water before being supplied to the evaporation unit; a water supply passage that allows the water tank and the evaporation unit to communicate with each other to supply the reforming water in the water tank to the evaporation unit; a water pump that supplies the reforming water in the water tank to the evaporation unit; a rotational speed sensor that detects the number of rotations per unit time of the water pump based on a physical quantity concerning the rotational speed of the water pump; and a control unit to which a detection signal of the rotational speed sensor is input and which controls the water pump, wherein, when the rotational speed of the water pump is abnormal or is expected to be abnormal with respect to a target rotational speed region during the power generation operation of the fuel cell, the control unit presumes that an influence is caused by resonance of the water pump, and executes an S/C value averaging control that alternately repeats an increase in a short time ($\Delta T$ increase, within 10 seconds) and a decrease in a short time ($\Delta T$ decrease, within 10 seconds) of the rotational speed of the water pump with respect to an abnormal rotational speed, while continuing the power generation operation of the fuel cell, and repeats the short time increase and the short time decrease of an S/C value in the reforming reaction, thereby averaging the S/C value.

Basically, the number of rotations per unit time of the water pump is determined based on the S/C value corresponding to the amount of power generation. Hereinafter, the rotational speed means the number of rotations per unit time.

Resonance is considered to occur at a particular rotational speed region. When the rotational speed of the water pump is abnormal with respect to a target rotational speed region due to resonance, if the water pump is changed to another rotational speed, the resonance of the water pump is suppressed. According to the present aspect, both the increased rotational speed and the reduced rotational speed are the rotational speed capable of suppressing the resonance of the water pump. Accordingly, resonance of the water pump is suppressed or avoided in the S/C value averaging control, which makes it possible to achieve an improvement in durability and long life of the water pump.

The description will be further added. During the power generation operation of the fuel cell, the rotational speed of the water pump may be abnormal with respect to the target rotational speed region in some cases. In this case, the flow rate of reforming water per unit time supplied to the evaporation unit by the water pump via the water supply passage may become excessive, or may become short. If the reforming water is excessive, the S/C value becomes higher than the appropriate region. If the reforming water is short, the S/C value becomes lower than the appropriate region. In this manner, even when the rotational speed of the water pump is abnormal with respect to the target rotational speed region, considering the request or the like of the power load, it is preferred to continue the power generation operation as long as possible, without stopping the power generation operation of the fuel cell.

Therefore, according to this aspect, the control unit first presumes that the influence is caused by the resonance of the water pump, and performs the S/C value averaging control that alternately repeats the control of increasing the rotational speed of the water pump by a short time ($\Delta T$ increase, within 10 seconds) with respect to the abnormal rotational speed, and the control of decreasing the rotational speed by a short time ($\Delta T$ decrease, within 10 seconds) while continuing the power generation operation of the fuel cell. Thus, the short time increase and the short time decrease are repeated in the S/C value in the reforming reaction, while suppressing or avoiding the resonance. As a result, the increase and the shortage of the amount of water vapor are repeated for each short time over time, the amount of water vapor is canceled and averaged, and thus, the averaging of the S/C value in the reforming reaction is achieved. Thus, excessive variations in the S/C value are suppressed.

$\Delta T$ increase and $\Delta T$ decrease can be appropriately selected depending on a rated output of the system, a capacity of the water pump, and the like, and times within 7 seconds, within 5 seconds, within 3 seconds, and within 1 second are exemplified, but are not limited thereto. Even when the rotational speed of the water pump is abnormal with respect to the target rotational speed region as described above, since the control unit continues the power generation operation as long as possible without stopping the power generation operation of the fuel cell, the system may not be stopped one by one, and the influence on the power load operated by the system is avoided.

When the rotational speed of the water pump is abnormal with respect to the target rotational speed region, the control unit presumes that the influence is caused by the resonance, and alternately repeats the increase in a short time ($\Delta T$ increase, within 10 seconds) and the decrease in a short time ($\Delta T$ decrease, within 10 seconds) of the rotational speed of the water pump with respect to the abnormal rotational speed so as to depart from a resonant frequency. By doing this, it is possible to achieve averaging of the S/C value and suppress the excessive variations in the S/C value, while suppressing or avoiding the resonance of the water pump or the like.

(2) According to the fuel cell system according to a second aspect of the present invention, in the above-described aspect, the control unit is provided with a storage unit, and performs a storage control of storing and updating an abnormal rotational speed as a storage rotational speed in the storage unit, when the rotational speed of the water pump is abnormal with respect to the target rotational speed region during the power generation operation of the fuel cell, each time the abnormal rotational speed occurs, and the control unit alternately repeats the increase in a short time ($\Delta T$ increase) and the decrease in a short time ($\Delta T$ decrease) of the rotational speed of the water pump with respect to the storage rotational speed in the S/C value averaging control.

According to this aspect, when the rotational speed of the water pump is abnormal with respect to the target rotational speed region during the power generation operation of the fuel cell, the control unit performs the storage control of storing and updating the abnormal rotational speed as the storage rotational speed in the storage unit. The control unit alternately repeats the increase in a short time ($\Delta T$ increase) and the decrease in a short time ($\Delta T$ decrease) of the rotational speed of the water pump with respect to the storage rotational speed, while suppressing or avoiding the resonance in the S/C value averaging control. Thus, the short time increase and the short time decrease of the S/C value in the reforming reaction are repeated. As a result, averaging of the S/C value is achieved over time. Thus, the excessive variations in the S/C value are suppressed.

When the factor in which the rotational speed of the water pump is abnormal with respect to the target rotational speed region is the influence of the resonance of the water pump, the resonant frequency may vary corresponding to the operating environment, the change over the years, or the like. Basically, the resonant frequency is influenced by the mass of the vibration source, and the spring constant of the elastic system that supports the vibration source. When the resonant frequency varies in this way, the rotational speed of which the rotational speed of the water pump becomes abnormal also varies. However, according to this aspect, if the rotational speed becomes abnormal, the control unit stores and updates the abnormal rotational speed as a storage rotational speed in the storage unit each time the rotational speed becomes abnormal, and increases or decreases the rotational speed of the water pump, based on the updated storage rotational speed. Thus, the control unit is able to cope with variation in the resonant frequency, and variation in the rotational speed to be abnormal.

(3) According to the fuel cell system according to a third aspect of the present invention, in the above-described aspects, the control unit is provided with a storage unit, when the rotational speed of the water pump is abnormal with respect to the target rotational speed region due to resonance during the power generation operation of the fuel cell, each time the abnormal rotational speed occurs, the control unit performs a storage control of storing and updating the abnormal rotational speed as a storage rotational speed in the storage unit, and performs the S/C value averaging control, and when the rotational speed of the water pump approaches toward the storage rotational speed in the subsequent power generation operation, the control unit alternately repeats an increase in a short time ($\Delta T$ increase) and a decrease in a short time ($\Delta T$ decrease) of the rotational speed of the water pump with respect to the storage rotational speed, while suppressing or avoiding the resonance, regardless of presence or absence of occurrence of the actual rotational speed abnormality. The approach means that when the storage rotational speed Nmemory is assumed to be 100 as a relative display, it comes closer to 90 or more or 95 or more.

According to this aspect, if the water pump rotational speed becomes abnormal, the control unit stores and updates the rotational speed as a storage rotational speed in the storage unit, and performs the S/C value averaging control. Moreover, in the subsequent power generation operation, when the rotational speed of the water pump approaches toward the storage rotational speed, the control unit alternately repeats an increase in a short time ($\Delta T$ increase) and a decrease in a short time ($\Delta T$ decrease) of the rotational speed of the water pump with respect to the storage rotational speed, regardless of presence or absence of occurrence of the actual rotational speed abnormality. For this reason, it is possible to prevent the resonance in advance, and to prevent the excessive variation in the S/C value in advance.

As described above, when the factor in which the rotational speed of the water pump is abnormal with respect to the target rotational speed region is the influence of the resonance of the water pump, in many cases, the resonant frequency varies corresponding to changes in the operating environment, the change over the years or the like. Even when the resonant frequency varies, when the rotational speed of the water pump is abnormal with respect to the target rotational speed region, each time the abnormal rotational speed occurs, the control unit stores and updates the abnormal rotational speed as the storage rotational speed in the storage unit. Moreover, when the rotational speed of the water pump approaches toward the storage rotational speed, the control unit can cope with variations in the resonant frequency and the rotational speed to be abnormal to perform the control on the storage rotational speed.

(4) According to the fuel cell system according to a fourth aspect of the present invention, in the above-described aspects, when the abnormality of the rotational speed of the water pump is not avoided even when performing the S/C value averaging control, the control unit presumes step-out of the water pump and stops the rotation of the water pump to stop the power generation operation of the fuel cell. When the abnormality of the rotational speed of the water pump is not avoided even when performing the S/C value averaging control, it is considered to be an important factor other than resonance. Therefore, the control unit presumes that step-out of the water pump occurs, and stops the rotation of the water pump to stop the power generation operation of the fuel cell, thereby attempting to protect the system. If the water pump is in the step-out state, since the control of the water pump is difficult, the supply of the reforming water to the evaporation unit is limited. Therefore, the control unit stops the rotation of the water pump to stop the power generation operation of the fuel cell. Caulking (carbonization of the raw material gas) in the reforming unit caused by shortage of water vapor is prevented in advance.

(5) According to the fuel cell system according to a fifth aspect of the present invention, in the above-described aspects, the water pump has a pump main body configured to supply the reforming water to the water supply passage, and a motor configured to rotate the pump main body, and the motor is a stepping motor or a DC motor. This aspect is able to cope with resonance and step-out of the stepping motor.

Effect of the Invention

According to the fuel cell system according to the present invention as described above, even when the rotational speed of the water pump is abnormal with respect to the target rotational speed region due to the resonance or the like during the power generation operation of the fuel cell, the resonance is suppressed or avoided by the S/C value averaging control of repeating the increase or decrease in the rotational speed of the water pump in a short time, and the S/C value in the reforming reaction is maintained at the appropriate region.

MODE FOR CARRYING OUT THE INVENTION

Hereinafter, each embodiment of the present invention will be described.

First Embodiment

Figure 1:
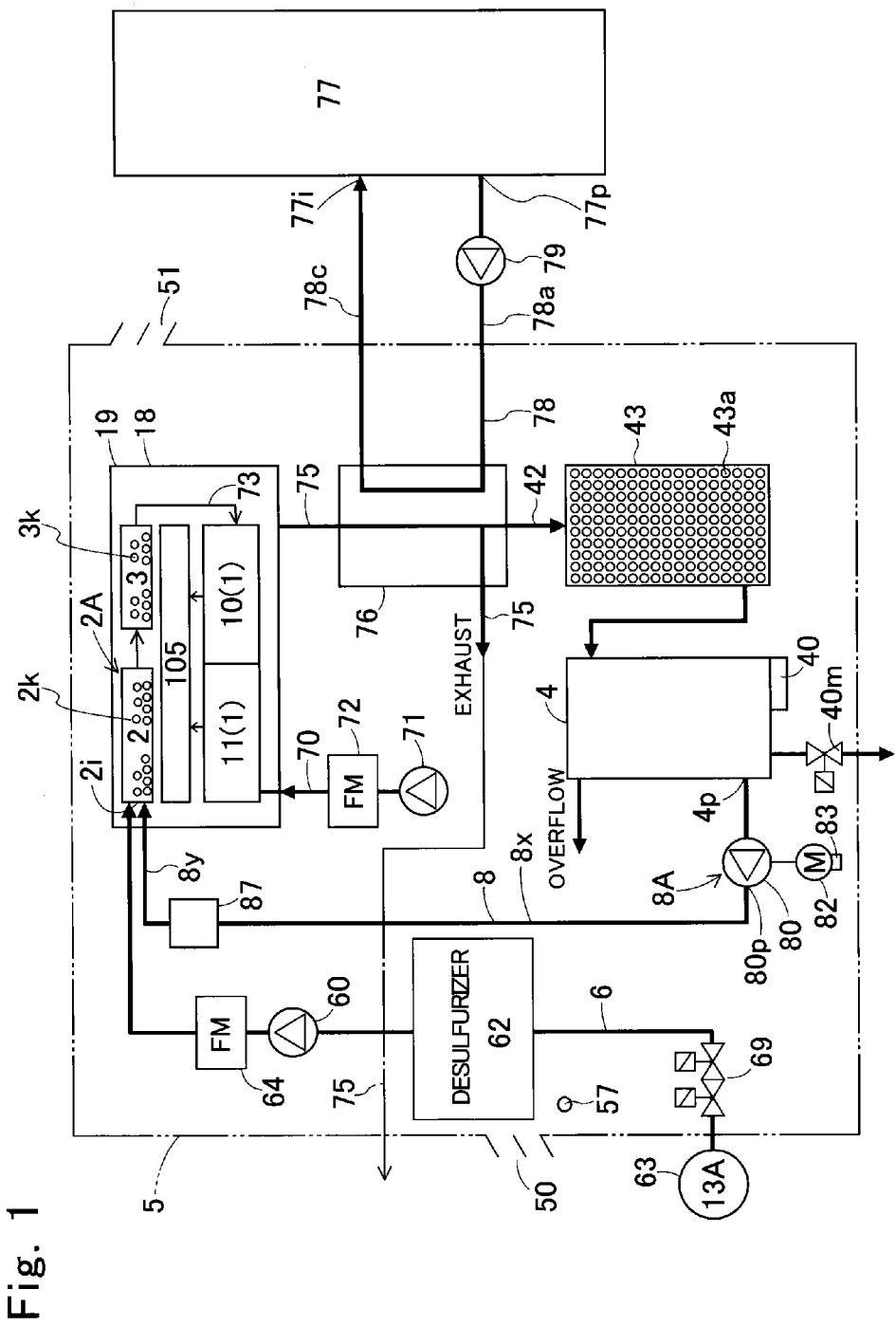
FIG. 1 is a conceptual diagram of a fuel cell system.
Figure 2:
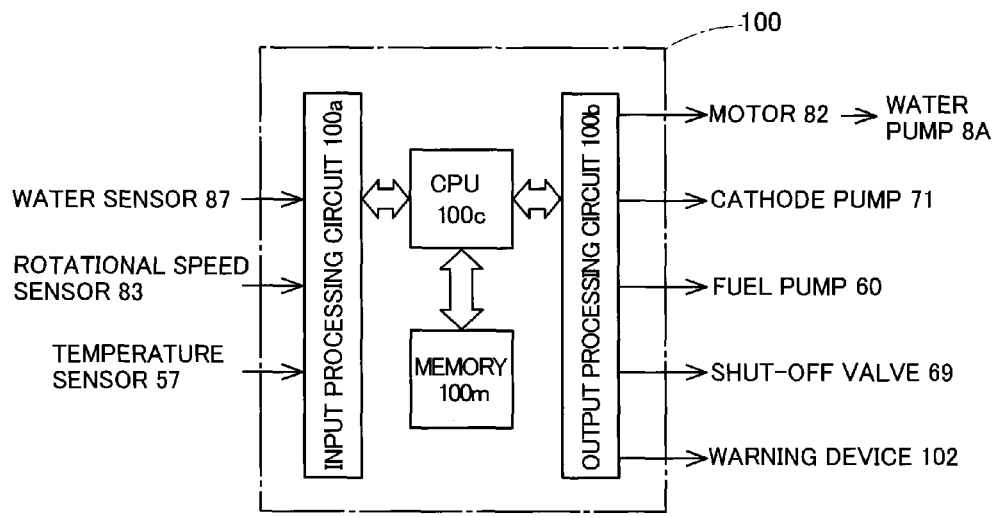
FIG. 2 is a conceptual diagram of a control unit.
Figure 3:
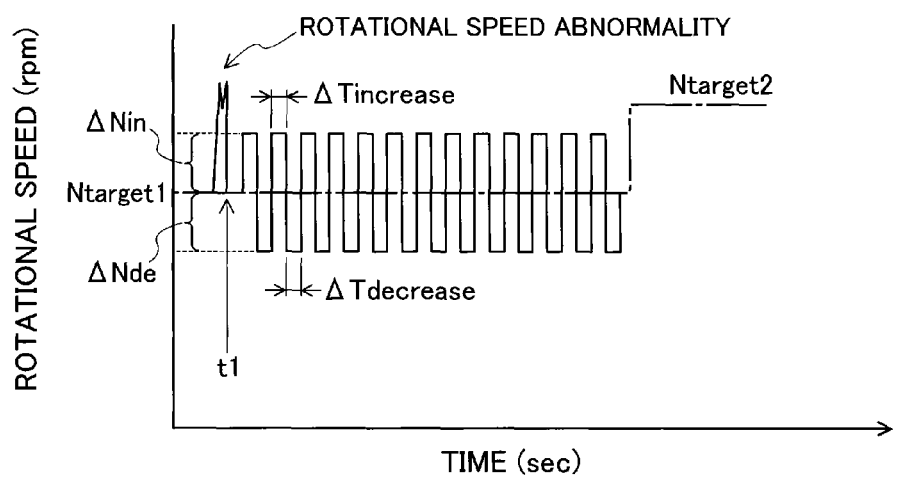
FIG. 3 is a graph illustrating an example of a control of increasing or decreasing a rotational speed of a motor.

FIGS. 1 to 3 illustrate the concept of the first embodiment. As illustrated in FIG. 1, the fuel cell system has a fuel cell 1, an evaporation unit 2 that generates water vapor by evaporating liquid-phase water, a reforming unit 3 that forms an anode gas by reforming a raw material gas using water vapor generated in the evaporation unit 2, a water tank 4 that stores the liquid-phase water to be supplied to the evaporation unit 2, and a housing 5 that accommodates these elements. The fuel cell 1 has an anode 10 and a cathode 11 that interpose an ion conductor therebetween, and can be applied, for example, to a solid oxide fuel cell 1, which is also referred to as SOFC (operating temperature: for example, 400° C. or higher).

The reforming unit 3 is formed by supporting a reforming catalyst on a ceramic carrier 3k, and is disposed adjacent to the evaporation unit 2. The evaporation unit 2 has a ceramic carrier 2k. The carriers 2k and 3k can have a granular shape, a honeycomb shape, or the like. The reforming unit 3 and the evaporation unit 2 form a reformer 2A, and are surrounded by a heat insulating wall 19 together with the fuel cell 1, thereby forming a power generation module 18. During the power generation operation, the reformer 2A is heated within the heat insulating wall 19 so as to be suitable for the reforming reaction. During the power generation operation, the evaporation unit 2 is heated so as to be able to convert water into water vapor by heating water. A combustion unit 105 heats the reforming unit 3 and the evaporation unit 2. A fuel passage 6 is intended to supply fuel from a fuel source 63 to the reformer 2A, and has a shut-off valve 69, a desulfurizer 62, a fuel pump 60, and a flow meter 64. An arrangement order thereof is not particularly limited. A cathode gas passage 70 for supplying a cathode gas (air) to the cathode 11 is connected to the cathode 11 of the fuel cell 1. In the cathode gas passage 70, a cathode pump 71 functioning as a gas conveying source for conveying the cathode gas, and a flow meter 72 are provided.

As illustrated in FIG. 1, the housing 5 has an intake port 50 and an exhaust port 51 communicating with the outside air, and a temperature sensor 57 that detects the temperature near the intake port 50 (outside air). The temperature sensor 57 may be provided as necessary. The water tank 4 configured to store the liquid-phase reforming water to be reformed by the reforming unit 3 is accommodated in the housing 5. The water tank 4 is provided with a drain valve 40m, and furthermore, is provided with a heating unit 40 having a heating function such as an electric heater, as necessary. The heating unit 40 is intended to heat the reforming water stored in the water tank 4, and can be formed by an electric heater or the like. When an environmental temperature such as the outside air temperature is low, based on a command from the control unit 100, water in the water tank 4 is heated by the heating unit 40, and freezing thereof is suppressed. In addition, it is preferred that the water level in the water tank 4 be basically substantially the same.

As illustrated in FIG. 1, the water supply passage 8 through which an outlet port 4p of the water tank 4 and an inlet port 2i of the evaporation unit 2 communicate with each other is provided in the housing 5 as a pipe. As illustrated in FIG. 1, since the water tank 4 is disposed on the lower side of the evaporation unit 2 within the housing 5, the water supply passage 8 extends along a vertical direction. The water supply passage 8 is a passage that supplies the water stored in the water tank 4 to the evaporation unit 2 from the outlet port 4p of the water tank 4 toward the inlet port 2i of the evaporation unit 2. The water supply passage 8 is provided with a water pump 8A that conveys the water in the water tank 4 to the evaporation unit 2. The water pump 8A has a pump main body 80, and an electric motor 82 that drives the pump main body 80. A rotational speed sensor 83 configured to detect the rotational speed of the motor 82 is provided in the motor 82. As the pump main body 80, it is possible to adopt a known pump with satisfactory sealing properties, such as a gear pump. In addition, the water supply passage 8 is adapted to communicate with the atmosphere via the evaporation unit 2, the reforming unit 3, the fuel cell 1, or the like. The water pump 8A may be provided on the outlet port 4p side of the water tank 4.

In the water supply passage 8, a water sensor 87 is provided at the downstream of the pump main body 80 and the upstream of the evaporation unit 2. The water sensor 87 detects the presence of water when there is water in the sensing region. The water sensor 87 is preferably disposed just before the inlet port 2i of the evaporation unit 2 in the water supply passage 8. When the distance from the outlet port 4p of the water tank 4 to the inlet port 2i of the evaporation unit 2 in the water supply passage 8 is relatively displayed as 100, it is preferred that the water sensor 87 be disposed within the range of 70 to 99 from the outlet port 4p of the water tank 4, in particular, in the range of 80 to 90.

The detection principle of the water sensor 87 may be anything, may be one of a method for detecting a change in capacitance based on the presence or absence of water, a method for detecting a change in an amount of power supply based on the presence or absence of water, a method for detecting a change in electrical resistance based on the presence or absence of water, a method for detecting a change in water pressure based on the presence or absence of water, and a method for detecting a change in magnetism based on the presence or absence of water or the like, and may be other methods. As illustrated in FIG. 1, the water tank 4, the pump main body 80, the water sensor 87, and the evaporation unit 2 are arranged in series in the water supply passage 8 in this order. The water supply passage 8 is provided with a passage portion 8x from the outlet port 4p of the water tank 4 to the water sensor 87, and a passage portion 8y from the water sensor 87 to the evaporation unit 2.

In addition, the water supply passage 8 is not provided with a flow meter that measures the flow rate of the reforming water. The reason is that the flow rate of the reforming water per unit time supplied to the water supply passage 8 is small, and thus, the detection accuracy of the flow meter is not necessarily sufficient. However, in some cases, a flow meter may be provided in the water supply passage 8 for checking the calculation result.

According to the present exemplary embodiment, the motor 82 configured to drive the pump main body 80 is able to rotate in a regular direction and a reverse direction. That is, the motor 82 is switchable between a regular operation of rotationally driving in the normal direction to convey the water in the water tank 4 toward the inlet port 2i of the evaporation unit 2 from the outlet port 4p, and a reverse operation of rotationally driving in the reverse direction to return water in the water supply passage 8 back into the water tank 4 from the outlet port 4p. As illustrated in FIG. 2, a control unit 100 for controlling the motor 82 via a drive circuit is provided. The control unit 100 has an input processing circuit 100a, an output processing circuit 100b, a CPU 100c having a timer measurement function, and a memory 100m that functions as a storage unit. As the motor 82, a DC motor, a stepping motor, and the like are exemplified. The DC motor is rotationally controlled by a DUTY ratio, and the stepping motor is rotationally controlled by the number of pulses. Each of the detection signals of the water sensor 87, the rotational speed sensor 83, and the temperature sensor 57 is input to the control unit 100 (see FIG. 2). The control unit 100 controls the water pump 8A via the motor 82. Furthermore, the control unit 100 is able to control the cathode pump 71, the fuel pump 60, the shut-off valve 69, and the warning device 102 (see FIG. 2).

(Operation of System)

When performing the power generation operation of the system, the control unit 100 executes a warming-up operation prior to the power generation operation. In the warming-up operation, in a state of opening the shut-off valve 69, the control unit 100 supplies the raw material gas to the combustion unit 105 via the fuel passage 6 and via the fuel cell 1 of the power generation module 18, by driving the fuel pump 60. The control unit 100 supplies air to the combustion unit 105 via the cathode gas passage 70 and via the cathode 11 of the power generation module 18 by driving the cathode pump 71. The raw material gas is combusted by the air in the combustion unit 105. By combustion heat in the combustion unit 105, the reforming unit 3, the evaporation unit 2, and the fuel cell 1 are heated. In the warming-up operation as described above, since the pump main body 80 is stopped and the reforming water in the water tank 4 is not supplied to the evaporation unit 2, the reforming process in the reforming unit 3 is not performed. When the reforming unit 3, the evaporation unit 2, and the fuel cell 1 are heated to a predetermined temperature range, the control unit 100 terminates the warming-up operation, and shifts the operation to the power generation operation.

In the power generation operation, when the control unit 100 drives the pump main body 80 by the regular operation by rotating the motor 82 in the regular direction, the liquid-phase reforming water in the water tank 4 is conveyed through the water supply passage 8 from the outlet port 4p of the water tank 4, and is supplied to the evaporation unit 2 from the inlet port 2i. The reforming water is heated in the evaporation unit 2 and is converted into the water vapor. The water vapor moves to the reforming unit 3 together with fuel supplied from the fuel passage 6 (preferably a gaseous state, but may be a liquid-phase state in some cases). The raw material gas in the reforming unit 3 is reformed with the water vapor, and is converted into the anode gas (hydrogen-containing gas) (endothermic reaction). The anode gas is supplied to the anode 10 of the fuel cell 1 via the anode gas passage 73. Furthermore, the cathode pump 71 is driven, and the cathode gas (oxygen-containing gas, air in the housing 5) is supplied to the cathode 11 of the fuel cell 1 via the cathode gas passage 70. This allows the fuel cell 1 to generate electricity.

In the warming-up operation and the power generation operation, the high-temperature exhaust gas generated in the power generation module 18 is exhausted to the outside of the housing 5 via the exhaust gas passage 75. The exhaust gas passage 75 is provided with a heat exchanger 76 having a condensation function. A hot-water passage 78 and a hot-water pump 79 connected to the hot-water storage tank 77 are provided. The hot-water passage 78 has a forward path 78a and a return path 78c. The low-temperature water in the hot-water storage tank 77 is discharged from the outlet port 77p of the hot-water storage tank 77 and passes through the forward path 78a by driving of the hot-water pump 79, reaches the heat exchanger 76, and is heated by the exhaust gas in the heat exchanger 76. Water heated in the heat exchanger 76 returns to the hot-water storage tank 77 from the return port 77i via the return path 78c. Water in the hot-water storage tank 77 is heated in this manner. Water vapor contained in the exhaust gas is converted into condensed water by being condensed in the heat exchanger 76. The condensed water flows down to a purification unit 43 by gravity or the like via a condensed water passage 42 extending from the heat exchanger 76. Therefore, the water purification unit 43 and the water tank 4 are positioned below the power generation module 18.

Since the water purification unit 43 has a water purification agent 43a such as ion-exchange resin, impurities in the condensed water are removed. Water from which impurities are removed is moved to the water tank 4, and is stored as the reforming water in the water tank 4. When the pump main body 80 is driven by the normal operation, the reforming water in the water tank 4 is supplied to the high-temperature evaporation unit 2 via the water supply passage 8, is supplied to the reforming unit 3 by being converted into water vapor in the evaporation unit 2, and is consumed as the reforming reaction that reforms the raw material gas in the reforming unit 3.

Herein, basically, the number of rotations per unit time of the water pump is determined based on the S/C value that is determined from the breakdown of the power generation module 18, the degradation of the power generation module 18, or the like. The S/C value means a molar ratio of water vapor (steam) to the carbon component (carbon) contained in the raw material gas in the water vapor reforming. General formula of the water vapor reforming is as follows (1).

$$C_nH_m + nH_2O \rightarrow nCO + [(m/2)+n]H_2 \qquad (1)$$

In the case of n=1, and m=4, methane is reformed by water vapor. S/C=2 is a state in which 2n mole of $H_2O$ is introduced into an amount of $C_nH_m$ 1 mole. In view of the protection properties of the power generation module 18, generally, the S/C value=2.5, and the range of S/C value is preferably in the range of 2.0 to 3.0. However, the range is not limited thereto.

If the reforming water is excessively supplied to the evaporation unit 2, there is a risk of an occurrence of failure, such as an excessive increase in an amount of water vapor, an excessive decrease in the temperature of the reforming unit 3 and the evaporation unit 2, a submersion of the reforming catalyst provided in the reforming unit 3, and an accelerated degradation of the reforming catalyst due to water vapor. In addition, when the water vapor supplied to the evaporation unit 2 of the power generation module 18 is too small, the water vapor lacks in the reforming reaction. In this case, there is a possibility that caulking (generation of carbon component) is generated in the reforming unit 3, and a failure of breakdown or degradation of the reforming unit 3 of the power generation module 18 is caused. The number of rotations per unit time of the water pump 8A is set based on an appropriate S/C value so as to suppress this failure.

Incidentally, during the power generation operation of the fuel cell 1, for some reasons, the rotational speed of the water pump 8A may be abnormal with respect to the target rotational speed region Ntarget1 in some cases. The rotational speed of the water pump 8A corresponds to the rotational speed of the motor 82. When the rotational speed abnormality occurs, the flow rate of the reforming water per unit time supplied to the evaporation unit 2 by the water pump 8A via the water supply passage 8 may become excessive, or become insufficient. If the reforming water is excessive, the S/C value becomes higher than the appropriate region. If the reforming water is insufficient, the S/C value becomes lower than the appropriate region. Even when the rotational speed of the water pump 8A is abnormal with respect to the target rotational speed region Ntarget1 as described above, in consideration of the power load request or the like, it is preferred that the power generation operation be continued as long as possible, without stopping the power generation operation of the fuel cell 1.

Therefore, according to the present embodiment, the control unit 100 first estimates that the resonance occurs, as illustrated in FIG. 3, immediately after the timing t1 when the rotational speed of the water pump 8A is abnormal with respect to the target rotational speed region Ntarget1, the control unit 100 executes a control that alternately repeats the control of increasing the rotational speed N of the water pump 8A with respect to the abnormal rotational speed in an amount of ΔNin for a short time (ΔT increase, within 5 seconds or within 2 seconds), and the control of decreasing the rotational speed N in an amount of ΔNde for a short time (ΔT decrease, within 5 seconds or within 2 seconds) while continuing the power generation operation of the fuel cell 1. Thus, the control of supplying much reforming water to the evaporation unit 2, and the control of supplying less reforming water to the evaporation unit 2 are alternately repeated along a time axis. Therefore, along the time axis, the excess and the shortage of water vapor are repeated in the evaporation unit 2 at a short time interval. Here, since there is a time lag when the reforming water is evaporated in the evaporation unit 2 and is converted into the water vapor, and the water vapor flows into the reforming unit 3 from the evaporation unit 2, a short time excess and a short time shortage of the water vapor are offset and become uniform. As a result, when viewed along the time axis, averaging of the S/C value in the reforming reaction is achieved. In this case, failures such as the occurrence of caulking (generation of carbon components) in the reforming unit 3, breakdown or degradation of the reforming unit 3 of the power generation module 18 are suppressed. The evaporation unit 2 has the carrier 2$k$ formed of ceramic, and the reforming unit has the carrier 3$k$ formed of ceramic. The carriers 2$k$ and 3$k$ have high heat storage characteristics, and even if the flow rate of the reforming water varies, the influence in the water vapor generation is suppressed.

According to the present exemplary embodiment, ΔNin/N is set depending on the fuel cell system, but, for example, it can be set in the range of ½ to ⅓₀, the range of ⅓ to ½₀, the range of ⅓ to ⅒, and the range of ¼ to ⅛. However, the range is not limited thereto. The ranges are different depending on the rated output of the fuel cell system or the like, but, for example, N can be in the range of 3 to 200 rpm, and in the range of 10 to 100 rpm. The same is also true for ΔNde/Nin. ΔNin/ΔNde can be in the range of 0.8 to 1.2. There can be relations of ΔNin=ΔNde and ΔNin≈ΔNde. However, the invention is not limited thereto.

According to the present embodiment as described above, even if the rotational speed of the water pump 8A is abnormal with respect to the target rotational speed region Ntarget1, taken as a whole, it is possible to suppress the excessive variations in the S/C value in the reforming reaction, while suppressing and avoiding the resonance of the water pump 8A. Here, when the time ΔT increase and the time ΔT decrease are excessively short, load is applied to the pump 8A. When the times are excessively long, the offset and uniformizing of the amount of water vapor along the time axis are not achieved. In consideration of these points, the time ΔT increase and the time ΔT decrease can be appropriately selected depending on the rated output of the fuel cell system, the capacity of the evaporation unit 32, or the like, but the time is preferably within 5 seconds. In addition, the times within 3 seconds and within 2 seconds are exemplified. Furthermore, the times within one second, within 500 milliseconds, and within 300 milliseconds are exemplified. However, the time is not limited thereto. Even when the rotational speed of the water pump 8A is abnormal with respect to the target rotational speed region Ntarget as described above, since the control unit 100 continues the power generation operation of the fuel cell 1 as long as possible, without stopping the power generation operation, the system may not be stopped one by one, and it is possible to reduce the running cost of the system.

Resonance occurs in a particular rotational speed region corresponding to the resonant frequency. When the rotational speed of the water pump 8A is abnormal with respect to the target rotational speed region due to resonance, if the rotational speed of the water pump 8A is changed to another rotational speed, the resonance of the water pump 8A is suppressed or avoided. Thus, both the increased rotational speed and the decreased rotational speed as described above are the rotational speed capable of suppressing the resonance of the water pump 8A. Accordingly, the resonance of the water pump 8A is suppressed in the S/C value averaging control, and it is possible to achieve improved durability and long life of the water pump 8A. For this reason, the S/C value averaging control also serves as the resonance avoidance control of the water pump 8A.

That is, in many cases, the factor when the rotational speed of the water pump 8A is abnormal with respect to the target rotational speed region Ntarget is resonance of the water pump 8A or the like. In this case, an increase in a short time (ΔT increase, within 5 seconds) and a decrease in a short time (ΔT decrease, within 5 seconds) of the rotational speed of the water pump 8A with respect to the abnormal rotational speed are alternately repeated so as to depart from the resonant frequency. In this way, it is possible to promote averaging of the overall S/C value, while avoiding the resonance of the water pump 8A or the like. Therefore, even if the resonance of the water pump 8A occurs, it is possible to suppress the excessive variation in the S/C value, thereby ensuring the durability of the power generation module 18. In other words, the increased rotational speed and the decreased rotational speed are the rotational speed that can prevent the resonance of the water pump 8A.

The control unit 100 continues the above-described control until the rotational speed of the water pump 8A is changed from the target rotational speed region Ntarget1 to Ntarget2 (see FIG. 3). If the rotational speed of the water pump 8A is abnormal with respect to the target rotational speed region Ntarget2, in the same manner as described above, the control unit 100 executes the control that alternately repeats the control of increasing the rotational speed N of the water pump 8A with respect to the abnormal rotational speed in an amount ΔNM for a short time (ΔT increase, within 5 seconds), and the control of decreasing the rotational speed N in an amount of ΔNde for a short time (ΔT decrease, within 5 seconds), while continuing the power generation operation of the fuel cell 1.

The control unit 100 continues the above-described control until the rotational speed of the water pump 8A is changed from the target rotational speed region Ntarget2 to Ntarget3. If the rotational speed of the water pump 8A is abnormal with respect to the target rotational speed region Ntarget3, in the same manner as described above, the control unit 100 executes the control. If executing the control that alternately repeats the control of increasing the rotational speed N of the water pump 8A in an amount of ΔNin for a short time (ΔT increase, within 5 seconds), and the control of decreasing the rotational speed N in an amount of ΔNde for a short time (ΔT decrease, within 5 seconds), it is also possible to expect removal of the water stain or the like in the water supply passage 8. Furthermore, a landing place in the evaporation unit 2 is also modified, which can contribute to the reduction of temperature variations in the evaporation unit 2.

In addition, according to the present embodiment, when abnormality of the rotational speed of the water pump 8A is not avoided even if executing the above-described control of the increase and decrease in the rotational speed, the control unit 100 preferably stops the rotation of the water pump 8A to stop the power generation operation of the fuel cell 1.

Second Embodiment

Since this embodiment has basically the same configuration, operation and effect as those of the first embodiment, FIGS. 1 to 3 are also applied correspondingly. When the rotational speed of the water pump 8A is abnormal with respect to the target rotational speed region Ntarget due to resonance during the power generation operation of the fuel cell 1, each time the abnormal rotational speed occurs, the control unit 100 performs the storage control that stores and updates the abnormal rotational speed as a storage rotational speed Nmemory in the memory 100m (storage unit). Furthermore, the control unit 100 alternately repeats the control of increasing the rotational speed of the water pump 8A in an amount of $\Delta$Nin for a short time ($\Delta$T increase), and the control of decreasing the rotational speed in an amount of $\Delta$Nde for a short time ($\Delta$T decrease) with respect to the storage rotational speed Nmemory. Accordingly, the short time increase and the short time decrease are alternately repeated on the flow rate of the water vapor in the reforming reaction. As a result, when a relatively long time elapses, the excess amount and the shortage amount of water vapor along the time axis are offset and averaged as described above, and averaging of the S/C value is achieved along the time axis. Therefore, even if the rotational speed of the water pump 8A is abnormal with respect to the target rotational speed region Ntarget, the excess and the shortage of water vapor are averaged and suppressed along the time axis, and the excessive variation in the S/C value along the time axis is suppressed, and degradation of the power generation module 18 is suppressed.

The resonant frequency may change due to a change in use environment, the change over the years, or the like. Basically, the resonant frequency of mechanical resonance is influenced by the mass of the vibration source and the spring constant of the elastic system that supports the vibration source. For example, the resonant frequency varies by mounting of the object onto the housing 5, the change of installation location for installing the housing 5, the change over the years of the mount or the like for supporting the water pump 8A, and the pipe replacement of the water pump 8A, and there is a concern that the rotational speed to be abnormal varies. The abnormal rotational speed at which the water pump 8A generates the resonance may vary due to the use environment, the change over the years, or the like. In this regard, according to the present exemplary embodiment, during the power generation operation of the fuel cell 1, when the rotational speed of the water pump 8A is abnormal with respect to the target rotational speed region Ntarget, each time the abnormality occurs, the control unit 100 stores and updates the abnormal rotational speed as a storage rotational speed Nmemory in the area of the memory 100m one by one. Moreover, the control unit 100 alternately repeats the control of increasing and decreasing the rotational speed of the water pump 8A with respect to the updated storage rotational speed Nmemory. For this reason, even if the resonant frequency varies due to the change of the operating environment, the change over the years, or the like during the power generation operation of the system, it is possible to quickly cope with the change. Thus, even if the rotational speed to be abnormal varies, the excessive variation in the S/C value in the reforming reaction is satisfactorily suppressed, and the degradation of the power generation module 18 is satisfactorily suppressed.

According to the present exemplary embodiment, when abnormality of the rotational speed of the water pump 8A is not avoided even when executing the above-described control of the increase and decrease of the rotational speed, the control unit 100 preferably stops the rotation of the water pump 8A to stop the power generation operation of the fuel cell 1.

Third Embodiment

Since this embodiment has basically the same configuration, operation, and effect as those of the first and second embodiments, FIGS. 1 to 3 are also applied correspondingly. When the rotational speed of the water pump is abnormal with respect to the target rotational speed region Ntarget during the power generation operation of the fuel cell, the abnormal rotational speed is stored and updated as the storage rotational speed Nmemory in the area of the memory 100m, the S/C value averaging control is performed, the resonance of the water pump 8A is avoided, and averaging of the S/C value along the time axis is achieved. In the subsequent power generation operation, when the rotational speed of the water pump 8A approaches toward the storage rotational speed Nmemory, the control unit 100 alternately repeats the control of increasing the rotational speed of the water pump 8A with respect to the storage rotational speed Nmemory in an amount of $\Delta$Nin for a short time ($\Delta$T increase), and the control of decreasing the rotational speed in an amount of $\Delta$Nde for a short time ($\Delta$T decrease), regardless of presence or absence of occurrence of resonance. Due to this, the resonance can be prevented in advance.

According to the present exemplary embodiment, when abnormality of the rotational speed of the water pump 8A is not avoided even when executing the above-described control of the increase and decrease of the rotational speed, the control unit 100 stops the rotation of the water pump 8A to stop the power generation operation of the fuel cell 1. When abnormality of the rotational speed of the water pump 8A is not avoided even when performing the above-described control, it is considered that there is an important factor other than resonance. When the motor 82 is a stepping motor, the abnormality is presumed to be caused by step-out of the stepping motor. If step-out occurs, driving of the stepping motor is restricted, and thus it is not possible to supply the reforming water to the water supply passage 8, which undesirably causes the power generation operation without water. Thus, the control unit 100 immediately stops the rotation of the water pump 8A to stop the power generation operation of the fuel cell 1, thereby attempting to protect the system.

Fourth Embodiment

Figure 4:
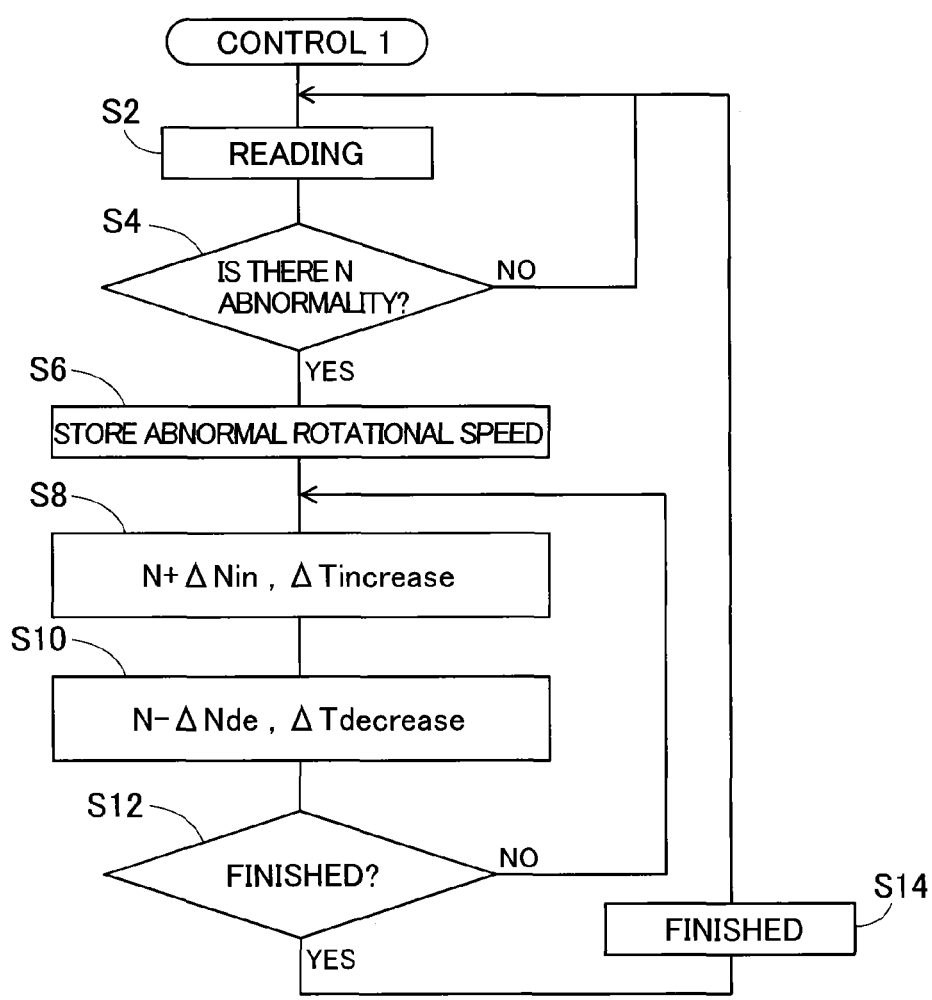
FIG. 4 is a flowchart illustrating a control law executed by the control unit as an S/C value averaging control according to another embodiment.
Figure 5:
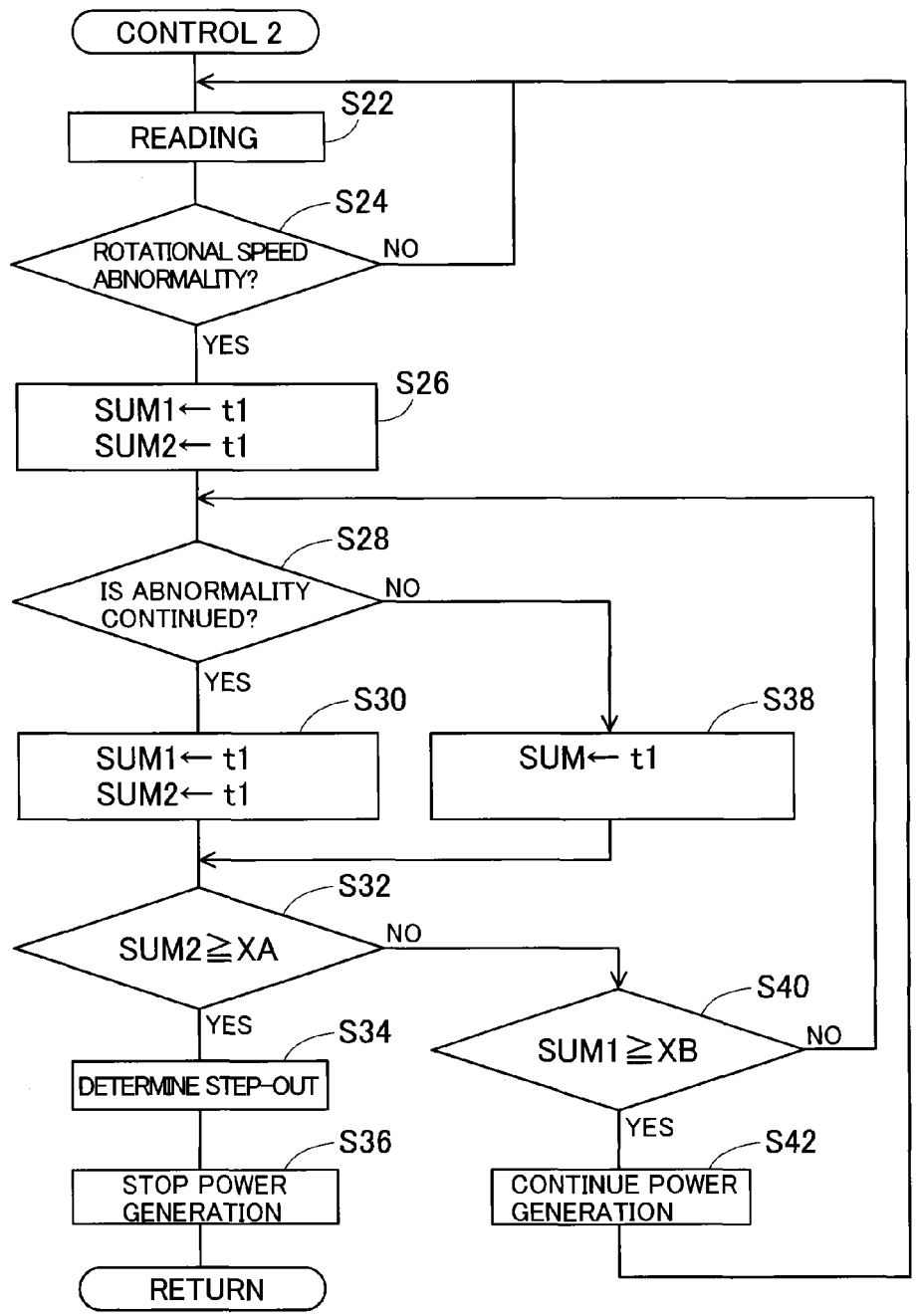
FIG. 5 is a flowchart illustrating a control law executed by the control unit as a step-out responding control.

FIGS. 4 and 5 illustrate flowcharts illustrating an example of the control law according to a fourth embodiment. Since the present embodiment has basically the same configuration, operation, and effect as those of the first to third embodiments, FIGS. 1 to 3 are applied correspondingly. The control unit 100 performs initial setting and reads the rotational speed of the motor 82 of the water pump 8A during the power generation operation of the fuel cell 1 (step S2). It is determined whether the rotational speed of the motor 82 of the water pump 8A greatly deviates from the target rotational speed region Ntarget1 and is abnormal (step S4). If the rotational speed is abnormal (YES in step S4), resonance is expected as the factor thereof. In this case, first, the S/C value averaging control also functioning as the resonance avoidance control is executed. In the case of the resonance, even if the water pump 8A is not stopped, that is, even if the system is not stopped, if the number of rotations per unit time of the water pump 8A is changed, it is possible to avoid the resonance. Therefore, the control unit 100 stores and updates the abnormal rotational speed as the storage rotational speed Nmemory in a predetermined area of the memory 100m (step S6). Next, the control unit 100 performs the S/C value averaging control that also serves as resonance avoidance (steps S8, S10). That is, the control unit 100 performs an acceleration control that increases the rotational speed of the water pump 8A with respect to the storage rotational speed Nmemory in an amount of ΔNin (for example, 2 to 7 rpm) for a short time (ΔT increase, for example, one second) so as to avoid the resonance of the water pump 8A (step S8). Furthermore, the control unit 100 performs a deceleration control that decreases the rotational speed of the water pump 8A with respect to the storage rotational speed Nmemory in an amount of ΔNde (for example, 2 to 7 rpm) for a short time (ΔT decrease, for example, one second) so as to avoid resonance in the S/C value averaging control (step S10). ΔNin, ΔNde, ΔT increase, and ΔT decrease are set depending on the capacity of the water pump 8A.

Next, it is determined whether the acceleration control and the deceleration control may be terminated (step S12). That is, if the rotational speed of the motor 82 of the water pump 8A is changed from the target rotational speed region Ntarget1 to Ntarget2 by a predetermined amount (see FIG. 3), since the resonance is avoided, the acceleration control and the deceleration control are terminated (step S14), and the process returns to step S2. If the rotational speed of the motor 82 of the water pump 8A is not changed from the target rotational speed region Ntarget1 to Ntarget2 (NO in step S12), it is estimated that the resonance is not avoided. For this reason, since the control unit 100 continues the acceleration control and the deceleration control and continuously performs the S/C value averaging control also serving as the resonance avoidance, the process returns to step S8. According to the present embodiment, when the rotational speed of the motor 82 of the water pump 8A is abnormal, since the control unit 100 continues the acceleration control and the deceleration control of the motor 82 by performing the S/C value averaging control, the resonance can be avoided, and since the excess and the shortage of water vapor are offset and averaged along the time axis, the excessive variation in the S/C value in the reforming reaction is prevented in advance.

As described above, when the rotational speed of the motor 82 of the water pump 8A is abnormal, the control unit 100 stores the abnormal rotational speed as the storage rotational speed Nmemory in the area of the memory 100m one by one. Even if the resonant frequency varies during the power generation operation, and the rotational speed to be abnormal varies, since the rotational speed of the water pump 8A is increased and decreased with respect to the storage rotational speed Nmemory corresponding to the rotational speed, the excess and the shortage of water vapor are offset and averaged along the time axis. Therefore, the excessive variation in the S/C value is satisfactorily suppressed, and the degradation of the power generation module 18 is satisfactorily suppressed.

According to the present exemplary embodiment, when abnormality of the rotational speed of the water pump 8A is not avoided even when executing the above-described control of the increase and decrease of the rotational speed, the control unit 100 stops the rotation of the water pump 8A to stop the power generation operation of the fuel cell 1. That is, when abnormality of the rotational speed of the water pump 8A is not avoided even when performing the above-described control, it is considered that there is an important factor other than resonance. When the motor 82 is a stepping motor, the abnormality is presumed to be caused by step-out of the stepping motor. If step-out occurs, it is difficult to control the rotation driving of the stepping motor, it is not possible to supply the reforming water to the water supply passage 8 as it is targeted, and in some cases, the power generation operation is undesirably performed in a waterless state. Therefore, when the rotational speed of the water pump 8A is abnormal even when performing the S/C value averaging control, the control unit 100 immediately stops the rotation of the water pump 8A to stop the power generation operation of the fuel cell 1, thereby promoting the protection of the system.

For this reason, the control unit 100 uses the control law illustrated in FIG. 4 (S/C value averaging control also serving as the resonance avoidance control), and the control law illustrated in FIG. 5 (step-out handling control) in combination. The control unit 100 puts the S/C value averaging control before the step-out handling control.

Next, the control law illustrated in FIG. 5 (step-out handling control) will be described. That is, the control unit 100 performs the initial setting, and reads the rotational speed of the motor 82 of the water pump 8A during the power generation operation of the fuel cell 1 (step S22). The control unit 100 determines whether the rotational speed of the motor 82 of the water pump 8A greatly deviates from the target rotational speed region Ntarget1 and is abnormal (step S24). If there is abnormality (YES in step S24), the control unit 100 increments a counter SUM1 indicating a light defect by one, and increments a counter SUM2 indicating a heavy defect by one (step S26). Furthermore, the control unit 100 reads the rotational speed of the motor 82 of the water pump 8A during the power generation operation of the fuel cell 1, and determines whether abnormality in which the rotational speed of the motor 82 greatly deviates from the target rotational speed region Ntarget1 is continued (step S28). If abnormality of the rotational speed of the motor 82 is continued (YES in step S28), the control unit 100 increments the light defect counter SUM1 by one, and increments the heavy defect counter SUM2 by one (Step S30). Furthermore, if the heavy defect counter SUM2 is equal to or greater than a threshold value XA (YES in step S32), since the abnormality of the rotational speed of the motor 82 is continued, the control unit 100 determines that the motor 82 (stepping motor) is in the step-out state (step S34), puts up flags that urgently stops the power generation of the fuel cell system (step S36) to stop the power generation, and returns the procedure to a main routine. If the counter SUM2 is less than the threshold value XA (NO in step S32), the control unit 100 does not determine that the motor 82 is in the step-out state, and the control unit 100 determines whether the light defect counter SUM1 is equal to or greater than a threshold value XB (step S40). If the light defect counter SUM1 is equal to or greater than the threshold value XB (NO in step S32), since abnormality such as resonance is considered to be avoidable, the flag that continues the power generation of the system is put up (step S42), and the process returns to step S22. As a result of determination of step S40, if the counter SUM1 is less than the threshold value XB (NO in step S40), the process returns to step S28 and it is determined whether the rotational speed abnormality is continued. In addition, if a regular time elapses, the counters SUM1 and SUM2 are cleared.

Fifth Embodiment

Figure 6:
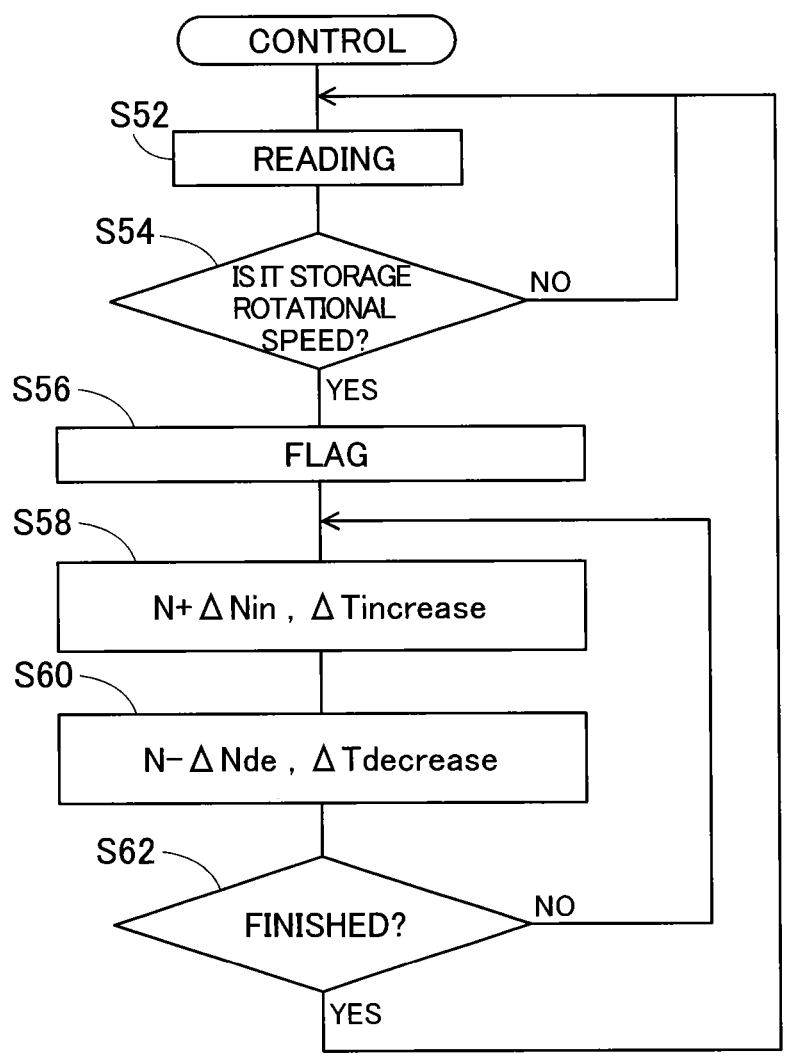
FIG. 6 is a flowchart illustrating a control law executed by the control unit as the S/C value averaging control according to another embodiment.

FIG. 6 is a flowchart illustrating an example of a control law according to the fifth embodiment. Since the present embodiment has basically the same configuration, operation, and effect as those of the above-described embodiments, FIGS. 1 to 3 are applied correspondingly. When the water pump 8A greatly deviates from the target rotational speed region Ntarget1 and becomes the abnormal rotational speed in a previous power generation operation, the abnormal rotational speed is stored and updated as the storage rotational speed Nmemory in a predetermined area of the memory 100m. First, the control unit 100 performs the initial setting, and reads the rotational speed of the motor 82 of the water pump 8A during the power generation operation of the fuel cell 1 (step S52). Regardless of whether the rotational speed of the motor 82 of the water pump 8A greatly deviates from the target rotational speed region Ntarget1 and is abnormal, it is determined whether the rotational speed approaches toward the storage rotational speed (step S54). If the rotational speed approaches toward the storage rotational speed (YES in step S54), regardless of whether the resonance and the step-out state actually occur, first, a flag of executing the S/C value averaging control also functioning as the resonance avoidance control is put up (step S56). The reason is that, in the case of the resonance, it is possible to avoid the resonance by changing the number of rotations per unit time of the motor 82 of the water pump 8A even without stopping the system.

Thus, the control unit 100 performs the S/C value averaging control that also serves as the resonance avoidance. That is, the control unit 100 performs an acceleration control of increasing the rotational speed of the water pump 8A with respect to the storage rotational speed Nmemory in an amount of ΔNin for a short time (ΔT increase) so as to avoid the resonance of the water pump 8A (step S58). Furthermore, the control unit 100 performs a deceleration control of decreasing the rotational speed of the water pump 8A with respect to the storage rotational speed Nmemory in an amount of ΔNde for a short time (ΔT decrease) so as to avoid resonance in the S/C value averaging control (step S60). Next, it is determined whether the acceleration control and the deceleration control may be terminated (step S62). That is, if the rotational speed of the motor 82 of the water pump 8A is changed from the target rotational speed region Ntarget1 to Ntarget2 by a predetermined amount (see FIG. 3), since the resonance is avoided, the acceleration control and the deceleration control are terminated (YES in step S62), and the process returns to step S52. If the rotational speed of the motor 82 of the water pump 8A is not changed from the target rotational speed region Ntarget1 to Ntarget2 (NO in step S62), it is considered that the resonance is not avoided. For this reason, since the control unit 100 continues the acceleration control and the deceleration control and continuously performs the S/C value averaging control (steps S58 and S60) also serving as the resonance avoidance control, the process returns to step S58. According to the present embodiment, since the acceleration control and the deceleration control of the motor 82 are continued at a timing immediately before the resonance occurs, resonance can be prevented in advance, and since the excess and the shortage of water vapor are averaged and suppressed along the time axis, it is possible to prevent the excessive variation in the S/C value in the reforming reaction in advance.

Sixth Embodiment

Since the present embodiment has basically the same configuration, operation, and effect as those of the above-described embodiments, FIGS. 1 to 3 are applied correspondingly. Since the evaporation unit 2 has a ceramic carrier 2k, stabilization of the temperature of the evaporation unit 2 is achieved. When the S/C value averaging control is executed, the flow rate of the liquid-phase reforming water to be supplied to the evaporation unit 2 is increased or decreased. For this reason, in order to further stabilize the temperature of the evaporation unit 2 in the S/C value averaging control, if necessary, it is possible to slightly increase the output of the cathode pump 71, slightly increase the flow rate per unit time of the cathode gas to be supplied to the combustion unit 105 via the cathode 11 of the fuel cell 1, and further stabilize the combustibility of the combustion unit 105. Extent that does not affect other elements is preferred.

[Others]

The present invention is not intended to be limited to the embodiments described above and illustrated in the drawings, but can be performed by being appropriately modified within the scope that is not apart from the gist. The fuel cell 1 is not limited to solid oxide fuel cell (SOFC), and in some cases, the fuel cell may be a polymer electrolyte fuel cell also referred to as PEFC (operating temperature: for example 70 to 100° C.), a phosphoric acid fuel cell also referred to as PAFC, and other types of fuel cells. In short, a fuel cell system that generates the water vapor in the evaporation unit 2 from the reforming water, and modifies gaseous phase or liquid phase fuel with the water vapor in the reforming unit 3 may be used. The heating unit 40 is provided in the water tank 4, but it may be abolished.

The following technical idea can be grasped from the above description.

[Supplementary Note 1] A method of generating electricity and operating a fuel cell system including: a fuel cell that is supplied with an anode gas and a cathode gas to generate electricity; an evaporation unit that evaporates reforming water to generate water vapor; a reforming unit that reforms a raw material gas using water vapor generated in the evaporation unit by a reforming reaction to form the anode gas; a water tank that stores the reforming water before being supplied to the evaporation unit; a water supply passage that allows the water tank and the evaporation unit to communicate with each other to supply the reforming water in the water tank to the evaporation unit; a water pump that supplies the reforming water in the water tank to the evaporation unit; a rotational speed sensor that detects the rotational speed of the water pump based on a physical quantity concerning the rotational speed of the water pump; and a control unit to which a detection signal of the rotational speed sensor is input and which controls the water pump, wherein when abnormality of the rotational speed of the water pump is detected with respect to a target rotational speed region during the power generation operation of the fuel cell, by alternately repeating an increase in a short time (ΔT increase, within 10 seconds) and a decrease in a short time (ΔT decrease, within 10 seconds) of the rotational speed of the water pump with respect to the abnormal rotational speed, while continuing the power generation operation of the fuel cell, averaging of an S/C value is achieved by repeating the short-time increase and the short-time decrease of the S/C value in the reforming reaction, thereby suppressing an excessive variation in the S/C value. In this case, a power generation method of the fuel cell system in which the averaging of the S/C value is achieved by repeating the short-time increase and the short-time decrease of the S/C value in the reforming reaction.

[Supplementary Note 2] A fuel cell system including: a fuel cell that is supplied with an anode gas and a cathode gas to generate electricity; an evaporation unit that evaporates reforming water to generate water vapor; a reforming unit that reforms a raw material gas using water vapor generated in the evaporation unit by a reforming reaction to form the anode gas; a water tank that stores the reforming water before being supplied to the evaporation unit; a water supply passage that allows the water tank and the evaporation unit to communicate with each other to supply the reforming water in the water tank to the evaporation unit; a water pump that supplies the reforming water in the water tank to the evaporation unit; a rotational speed sensor that detects the rotational speed of the water pump based on a physical quantity concerning the rotational speed of the water pump; and a control unit to which a detection signal of the rotational speed sensor is input and which controls the water pump, wherein when the rotational speed of the water pump is abnormal with respect to a target rotational speed region due to resonance during the power generation operation of the fuel cell, the control unit performs a resonance avoidance control while continuing the power generation operation of the fuel cell, and when the abnormality of the rotational speed of the water pump is not avoided even after performing the resonance avoidance control, the control unit stops the rotation of the water pump to stop the power generation operation of the fuel cell. Since the power generation operation is continued as long as possible, the running cost of the system is reduced.

EXPLANATIONS OF LETTERS OR NUMERALS

1: fuel cell
10: anode
11: cathode
2A: reformer
2: evaporation unit
3: reforming unit
4: water tank
5: housing
57: temperature sensor
6: fuel passage
60: fuel pump
62: desulfurizer
69: shut-off valve
70: cathode gas passage
71: cathode pump
73: anode gas passage
75: exhaust gas passage
77: hot-water storage tank
8: water supply passage
8A: water pump
80: water pump
82: motor
83: rotational speed sensor
87: water sensor
100: control unit

The invention claimed is:

1. A fuel cell system comprising:
a fuel cell that is supplied with an anode gas and a cathode gas to generate electricity;
an evaporation unit that evaporates reforming water to generate water vapor;
a reforming unit that reforms a raw material gas using the water vapor generated in the evaporation unit by a reforming reaction to form the anode gas;
a water tank that stores the reforming water before being supplied to the evaporation unit;
a water supply passage that allows the water tank and the evaporation unit to communicate with each other to supply the reforming water in the water tank to the evaporation unit;
a water pump that supplies the reforming water in the water tank to the evaporation unit;
a rotational speed sensor that detects number of rotations per unit time of the water pump based on a physical quantity concerning the rotational speed of the water pump; and
a control unit that is programmed to input a detection signal of the rotational speed sensor and to control the water pump,
the control unit is programmed to presume an influence that is caused by resonance of the water pump when the rotational speed of the water pump is abnormal or is expected to be abnormal with respect to a target rotational speed region during the power generation operation of the fuel cell, and to execute an S/C value averaging control that alternately repeats an increase in a short time ($\Delta T$ increase, within 10 seconds) and a decrease in a short time ($\Delta T$ decrease, within 10 seconds) of the rotational speed of the water pump with respect to the abnormal rotational speed while continuing the power generation operation of the fuel cell, and repeats the short time increase and the short time decrease of the rotational speed of the water pump and thus a short time increase and the short time decrease of an S/C value in the reforming reaction, thereby averaging the S/C value which is directly correlated to the rotational speed of the water pump, wherein the S/C value is a molar ratio of water vapor to a carbon component contained in the raw material gas.

2. The fuel cell system according to claim 1, wherein the control unit is provided with a storage unit and the control unit is programmed to perform a storage control of storing and updating the abnormal rotational speed as a storage rotational speed in the storage unit each time the abnormal rotational speed occurs, and
the control unit is programmed to alternately repeat the short time increase and the short time decrease of the rotational speed of the water pump with respect to the storage rotational speed in the S/C value averaging control.

3. The fuel cell system according to claim 1, wherein the control unit is provided with a storage unit and the control unit is programmed to perform a storage control of storing and updating the abnormal rotational speed as a storage rotational speed in the storage unit each time the abnormal rotational speed occurs, and
when the rotational speed of the water pump approaches toward a storage rotational speed in the subsequent power generation operation, the control unit is programmed to alternately repeat the short time increase and the short time decrease of the rotational speed of the water pump with respect to the storage rotational speed, while suppressing or avoiding the resonance, regardless of presence or absence of occurrence of the actual rotational speed abnormality.

4. The fuel cell system according to claim 1, wherein, when the abnormality of the rotational speed of the water pump is not avoided even when performing the S/C value averaging control, the control unit is programmed to presume that step-out of the water pump occurs, and stops the rotation of the water pump to stop the power generation operation of the fuel cell.

* * * * *